(12) United States Patent
Noro et al.

(10) Patent No.: US 6,634,562 B1
(45) Date of Patent: Oct. 21, 2003

(54) RECORDING AND REPRODUCING APPARATUS, RECORDING MEDIUM ADAPTER APPARATUS, AND RECORDING AND REPRODUCING METHOD

(75) Inventors: Masahiko Noro, Kanagawa (JP); Atsuhiro Kumagai, Kanagawa (JP); Mitsunori Sakama, Tokyo (JP)

(73) Assignee: Sony Corporation, Tokyo (JP)

( * ) Notice: Subject to any disclaimer, the term of this patent is extended or adjusted under 35 U.S.C. 154(b) by 163 days.

(21) Appl. No.: 09/609,357

(22) Filed: Jul. 5, 2000

(30) Foreign Application Priority Data

Jul. 7, 1999 (JP) ............................................. 11-193286

(51) Int. Cl.$^7$ ............................................. G06K 19/04
(52) U.S. Cl. ...................................... 235/492; 235/493
(58) Field of Search ................................. 235/492, 493

(56) References Cited

U.S. PATENT DOCUMENTS 5,159,182 A  10/1992  Eisele
6,510,125 B1 * 1/2003  Shigetomi et al. .......... 235/493

* cited by examiner

Primary Examiner—Harold I. Pitts
(74) Attorney, Agent, or Firm—Jay H. Maioli

(57) ABSTRACT

There is provided a recording and reproducing apparatus, a recording medium adapter apparatus, and a recording and reproducing method which allows exit from the power saving mode without conducting the reset using ejection and re-insertion of a recording medium. An FD drive device 20 includes a switch for detecting that an FD type card adapter 1 which conducts data processing to record data onto a memory card or reproduce data from the memory card has been inserted, and a luminous element 30 which conducts communication of predetermined control data to a light receiving element 8 of the FD type card adapter 1 in order to effect control related to data recording or reproducing operation. As a result, it is possible to restore the FD type card adapter from the power saving mode and shift the FD type card adapter to an arbitrary control state, without conducting the reset using ejection and re-insertion of a recording medium.

11 Claims, 10 Drawing Sheets

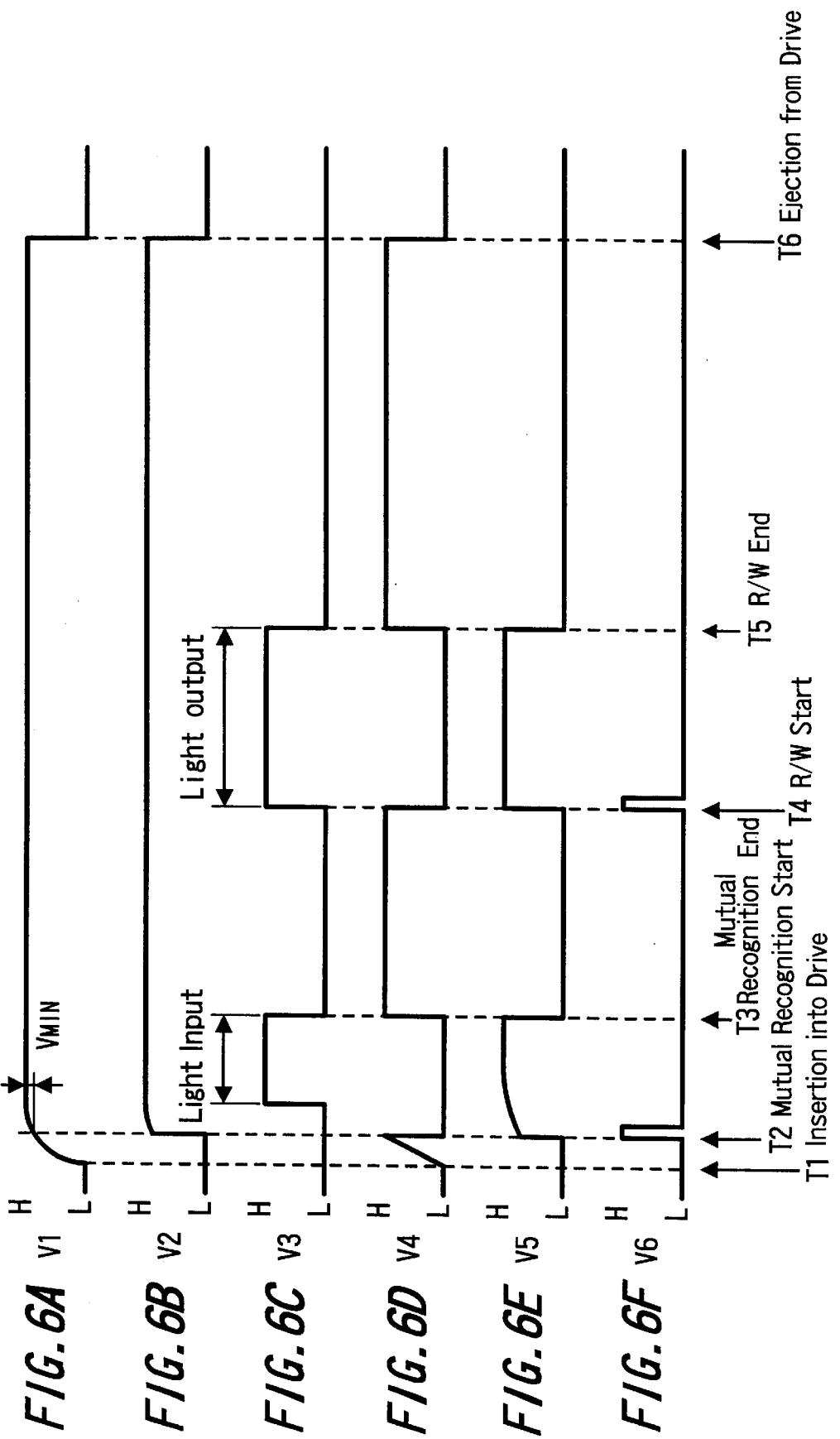

RECORDING AND REPRODUCING APPARATUS, RECORDING MEDIUM ADAPTER APPARATUS, AND RECORDING AND REPRODUCING METHOD

BACKGROUND OF THE INVENTION

1. Field of the Invention

The present invention relates to a recording and reproducing apparatus, a recording medium adapter apparatus, and a recording and reproducing method for conducting data processing in order to record or reproduce data on a recording medium instead of another recording medium.

2. Description of the Related Art

A prior art data recording medium is disclosed in U.S. Pat. No. 5,159,182. The prior art data recording medium is formed so as to have an external shape of a floppy disk 100 shown in FIG. 10 or a cassette tape which is not illustrated. The prior art data recording medium can be inserted into or ejected from an existing recording and reproducing apparatus. Like a floppy disk (FD) type card adapter 111 shown in FIG. 11, the prior art data recording medium includes therein a write and read device 114 serving as an interface for exchanging data with recording and reproducing means of the recording and reproducing apparatus, a semiconductor memory or memory card 119, a processor 115 for controlling exchange of data between the memory and the interface, and a battery 117 and/or a power generation unit as power supply.

If the recording and reproducing apparatus does not operate such prior art recording medium for several minutes, then the processor 115 of the recording medium is adapted to come into a power saving mode in order to suppress the consumption of power supplied from the battery 117 in the recording medium. Once the processor 115 comes into the power saving mode, however, the processor 115 cannot exit the power saving mode so long as a main switch 113 of the recording medium is not reset. The recording medium is formed so that resetting will be conducted in this case by ejecting the recording medium from the recording and reproducing apparatus and inserting the recording medium into the recording and reproducing apparatus again. Since there is no space to mount a battery 117 having a sufficient capacity because of the above described configuration of the recording medium, it is an important problem to suppress the power consumption. In some applications, however, it causes a problem in durability and inconvenience in use to pull out and insert the recording medium frequently in order to exit the power saving mode. In addition, there is a disadvantage that it takes a long time for reuse once the recording medium is reset.

The structure of the FD type card adapter serving as a concrete recording medium and how to turn on and off the main switch will hereafter be described. FIG. 10 shows the floppy disk (FD) 100. FIG. 11 shows the FD type card adapter 111 for a floppy disk drive (FDD). When the floppy disk (FD) 100 is inserted into the FDD, an opening and shutting lever 102 of the FDD moves leftward and downward as represented by a dotted line in FIG. 10, and thereby a shutter 101 is elastically moved to its opening position as illustrated. When the floppy disk (FD) 100 is ejected from the FDD, the opening and shutting lever 102 of the FDD moves upward and rightward as represented by the dotted line, and thereby the shutter 101 is elastically moved to its closing position.

If the FD type card adapter 111 as shown in FIG. 11 is inserted into the FDD, then the above described opening and shutting lever 102 of the FDD moves leftward and downward in the same way, and thereby a shutter window 120 is elastically moved to its opening position as illustrated. Accordingly, an actuator 112 is rotationally moved in the counterclockwise direction from a position indicated by a solid line to a position indicated by a dotted line. As a result, a contact of a switch 113 is opened (turned on). If the FD type card adapter 111 is ejected from the FDD, then the above described opening and shutting lever 102 moves upward and rightward in the same way, and thereby the shutter window 120 is elastically moved to its closing position. Accordingly, the actuator 112 is rotationally moved in the clockwise direction from the position indicated by the dotted line to the position indicated by the dotted line. As a result, the contact of the switch 113 is closed (turned off). While the FD type card adapter 111 is inserted in the FDD, the opening and shutting lever 102 continues to elastically press the actuator 112 to the position indicated the dotted line. This results in a disadvantage that it is impossible to reset the processor 115 by turning on and off the switch 113 unless the FD type card adapter 111 is ejected from the FDD and inserted into the FDD again.

SUMMARY OF THE INVENTION

In view of the points heretofore described, the present invention has been made. An object of the present invention is to provide a recording and reproducing apparatus, a recording medium adapter apparatus, and a recording and reproducing method allowing exit from the power saving mode without conducting the reset using ejection and re-insertion of the recording medium.

In order to solve the above described problems, a recording and reproducing apparatus of the present invention includes: recording and reproducing means for conducting data writing or reading on a predetermined recording medium; detection means for detecting that a recording medium adapter for conducting data writing or reading on another recording medium different from the recording medium by using the recording and reproducing means has been inserted; and communication means for conducting communication of control data of predetermined data, in order to effect control related to operation of the recording and reproducing means between the recording medium adapter and the recording and reproducing apparatus, when insertion of the recording medium adapter has been detected by the detection means.

Furthermore, a recording medium adapter apparatus of the present invention includes: detection means for detecting that the recording medium adapter apparatus has been inserted into a recording and reproducing apparatus for conducting data writing or reading on a predetermined recording medium by using recording and reproducing means; data processing means for conducting processing to conduct data writing or reading on another recording medium different from the recording medium by using the recording and reproducing means; and communication means for conducting communication of control data of predetermined data, in order to effect control related to operation of the recording and reproducing means between the recording and reproducing apparatus and the recording medium adapter apparatus, when insertion of the recording medium adapter apparatus into the recording and reproducing apparatus has been detected by the detection means.

Furthermore, a recording and reproducing method of the present invention includes the steps of: detecting that a recording medium adapter has been inserted into a recording and reproducing apparatus for conducting data writing or reading on a predetermined recording medium; conducting communication of control data of predetermined data, in order to effect control related to recording and reproducing operation between the recording and reproducing apparatus and the recording medium adapter, when insertion of the recording medium adapter into the recording and reproducing apparatus has been detected; and conducting data processing to effect data writing or reading on another recording medium different from the recording medium.

According to the recording and reproducing apparatus, the recording medium adapter apparatus, and the recording and reproducing method of the present invention, operations described below are conducted.

First of all, the recording and reproducing apparatus ascertains the existence of a recording medium by using the detection means. If the recording medium is not inserted, then waiting is conducted. If the recording medium is inserted, then the kind of the recording medium is ascertained. The recording and reproducing apparatus conducts trial reproduction. Detection using a switch is conducted. Or it is determined whether data reading of a recording medium permitted to use could be conducted, and it is determined whether data reading of the recording medium adapter apparatus could be conducted. Thereby the recording and reproducing apparatus recognizes the kind of the recording medium.

If the recording medium is judged to be the recording medium adapter apparatus, then a switch to the recording or reproducing mode for the recording medium adapter apparatus is conducted. The recording and reproducing apparatus fixes the recording and reproducing means in a specific position. By the way, the head fixing position is such a position that interfacing with the data processing means for conducting data writing and reading on the recording medium adapter apparatus is possible.

The recording and reproducing apparatus determines whether there is a recording or reproducing request. The recording and reproducing apparatus determines whether a recording or reproducing operation order is issued directly by input operation or from the outside.

If a recording or reproducing operation order is not issued within a predetermined time, then a shift to the power saving mode is conducted. The recording and reproducing apparatus controls the recording medium adapter apparatus so as to bring the recording medium adapter apparatus in such a state that the power consumption of the battery is reduced.

If there is a recording or reproducing order, the recording and reproducing apparatus conducts communication of predetermined control data by using the communication means. A control signal for causing communication of the control data is supplied from the outside. Thereupon, the recording and reproducing apparatus supplies a drive signal for communication to the communication means on the basis of the control signal. On the basis of the drive signal, the communication means conducts communication and supplies control data to the recording medium adapter apparatus.

As a result, the communication means of the recording medium adapter apparatus receives the control data, and supplies the control data to the active state control means. The active state control means shifts the recording medium adapter apparatus from the power saving mode state to the active state allowing the operation for recording or reproducing the data.

After the recording medium adapter apparatus is shifted into the active state, ordinary operation is conducted. In the active state, recording or reproducing operation is immediately conducted on another recording medium of the recording medium adapter apparatus on the basis of the input operation in the recording and reproducing apparatus or a recording or a reproducing operation order supplied from the outside.

BRIEF DESCRIPTION OF THE DRAWING

FIGS. 6A through 6F are time charts showing the operation of an active state control circuit in an embodiment according to the present invention, in which FIG. 6A shows charging voltage of a capacitor supplied from a battery, FIG. 6B shows a voltage detection IC output, FIG. 6C shows a phototransistor output, FIG. 6D shows a NAND circuit output, FIG. 6E shows a FET switch output, and FIG. 6F shows a reset circuit output;

FIGS. 7A through 7C are diagrams showing an example of a circuit of luminous element side in an embodiment according to the present invention, in which FIG. 7A shows luminescence caused by a dedicated control signal, FIG. 7B shows luminescence caused by rotation of a spindle motor, and FIG. 7C shows luminescence caused by drive select;

DETAILED DESCRIPTION OF THE PREFERRED EMBODIMENTS

Figure 1:
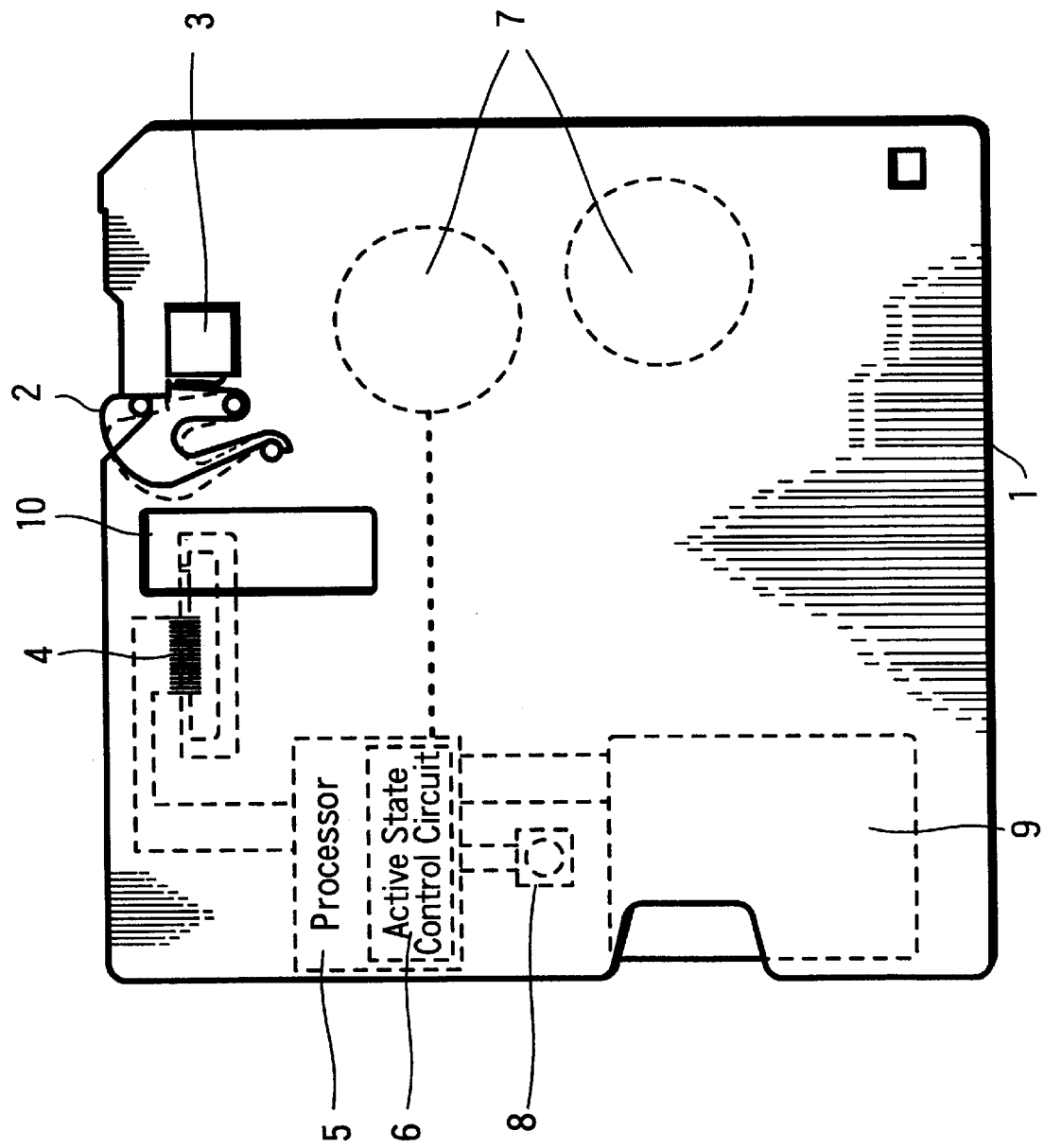
FIG. 1 is a diagram showing the configuration of an FD type card adapter in an embodiment of the present invention.

Hereafter, a recording and reproducing apparatus of an embodiment according to the present invention will be described by suitably referring to the drawing.

A recording medium adapter of the present embodiment is applied to a data recording medium. Such a data recording medium is formed so as to have an external shape of a floppy disk or a cassette tape. Such a data recording medium can be inserted into or ejected from an existing recording and reproducing apparatus. Such a data recording medium includes therein an interface for exchanging data with recording and reproducing means of the recording and reproducing apparatus, a semiconductor memory or memory card, a processor for controlling exchange of data between the memory and the interface, and a battery as power supply. When communication of control data has been conducted between the recording medium adapter and the recording and reproducing apparatus by using communication means, the recording medium adapter controls the recording medium to bring about such a state that operation for recording or reproducing data is possible.

FIG. 1 is a diagram showing the configuration of an FD type card adapter according to the present embodiment. An FD type card adapter 1 shown in FIG. 1 corresponds to the FD type card adapter 111 shown in FIG. 11. An actuator 2 corresponds to the actuator 112. A switch 3 corresponds to the switch 113. A write and read device 4 corresponds to the write and read device 114. A processor 5 corresponds to the processor 115. A battery 7 corresponds to the battery 117. A memory card 9 corresponds to the memory card 119.

Figure 11:
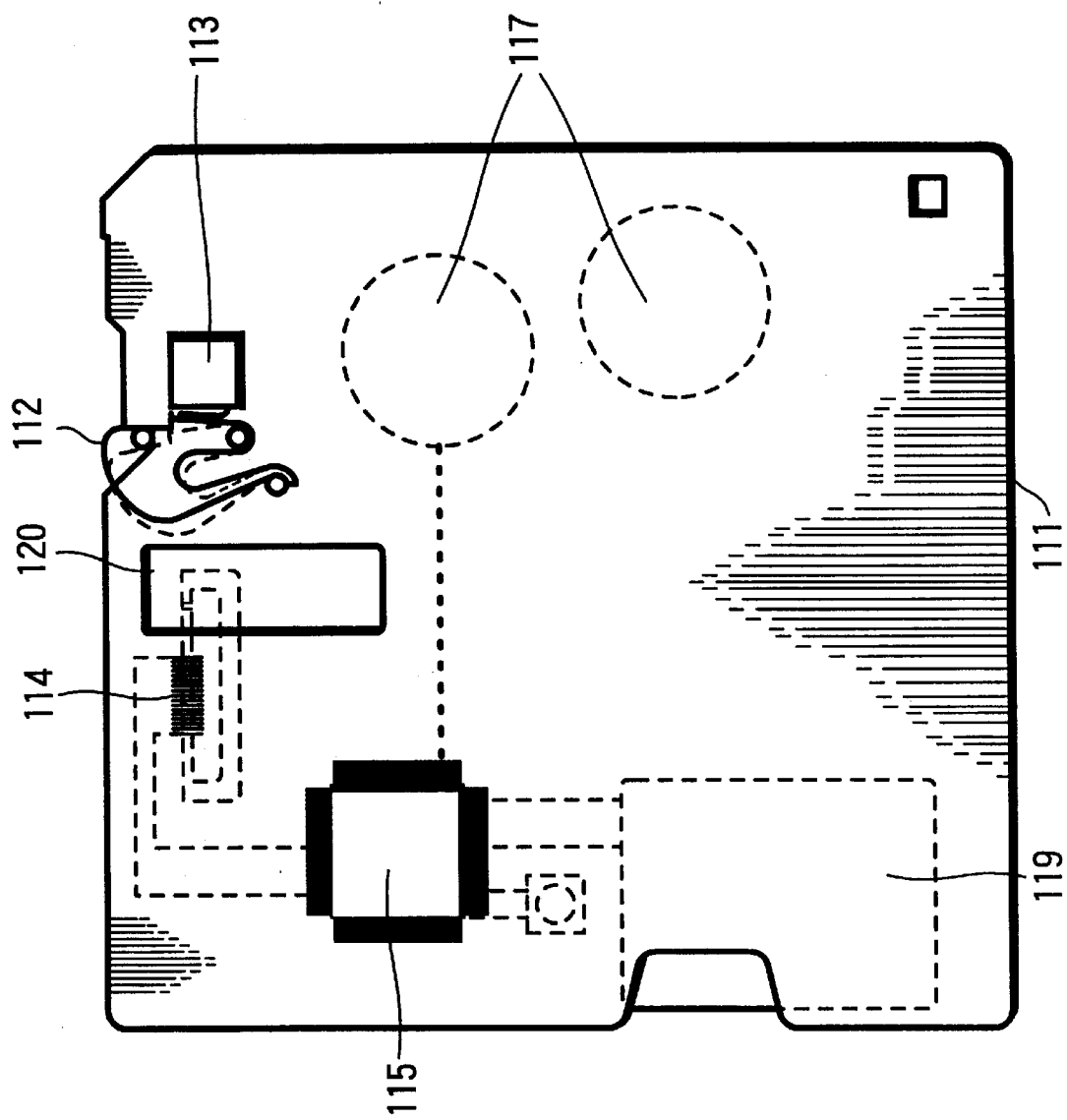
FIG. 11 is a diagram showing the configuration of a prior art FD type card adapter.

The FD type card adapter 1 shown in FIG. 1 differs from the FD type card adapter 111 shown in FIG. 11 in that the FD type card adapter 1 includes a light receiving element 8 forming communication means for conducting communication with the recording and reproducing apparatus and an active state control circuit 6 for causing a transition from a power saving mode to an active state to allow operation for recording or reproducing data. The remaining portion of the configuration is the same as that of the FD type card adapter 111 shown in FIG. 11.

The FD type card adapter 1 of the present embodiment having such a configuration operates as hereafter described.

If the recording and reproducing apparatus does not operate the FD type card adapter 1 for several minutes, then the processor 5 is adapted to come into the power saving mode in order to suppress the consumption of power supplied from the battery 7 in the FD type card adapter 1 as described with reference to FIG. 11.

If in this state the recording and reproducing apparatus issues an operation order of recording or reproducing to the FD type card adapter 1 inserted into the recording and reproducing apparatus, then communication of control data is conducted between the FD type card adapter 1 and the recording and reproducing apparatus by using the light receiving element 8. Thereupon, the FD card adapter 1 effects control so as to cause a shift from the power saving mode to an active state, in which operation for recording or reproducing is possible, by using the active state control circuit 6. In the active state, the recording and reproducing apparatus immediately conducts the recording or reproducing operation.

Figure 2A:
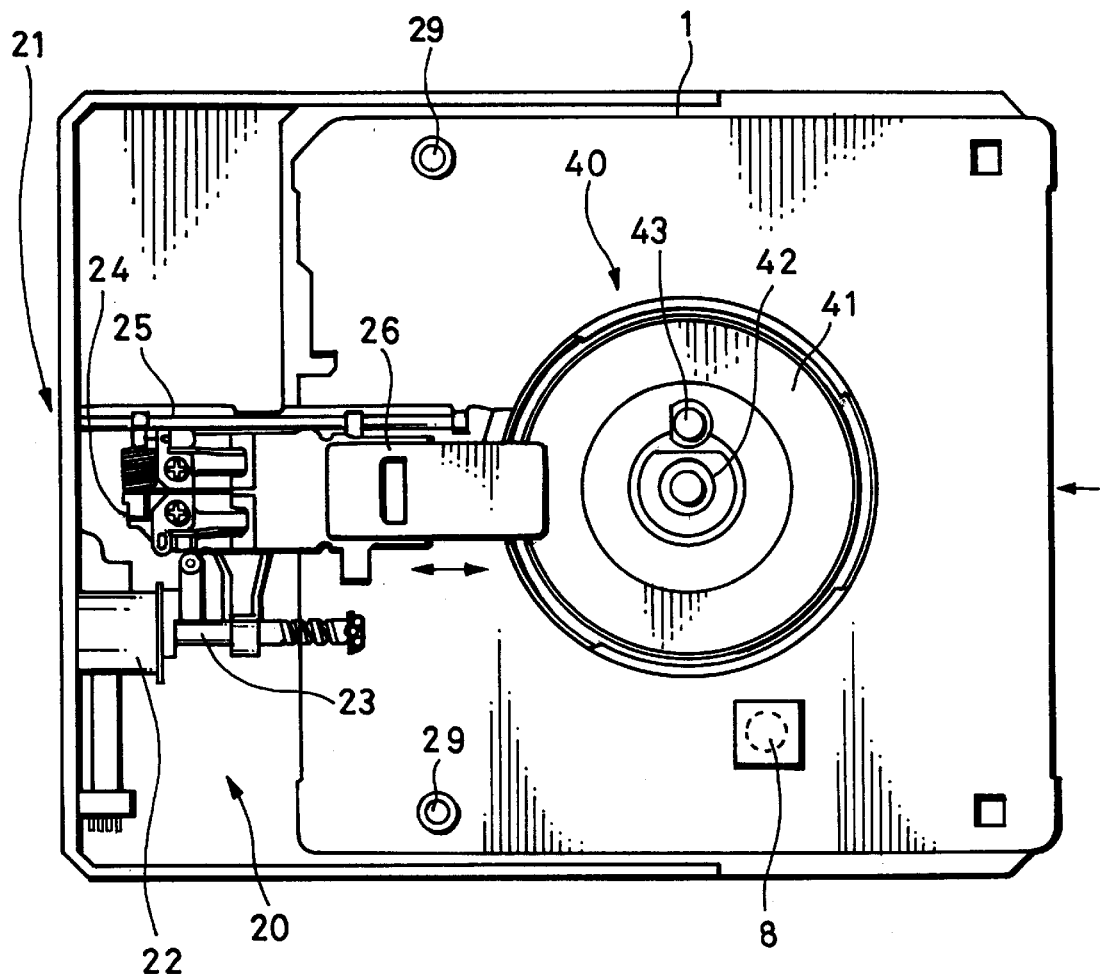
FIGS. 2A and 2B are respectively a top view and a side view showing such a state that an FD type card adapter of an embodiment according to the present invention is inserted in a drive device.
Figure 2B:
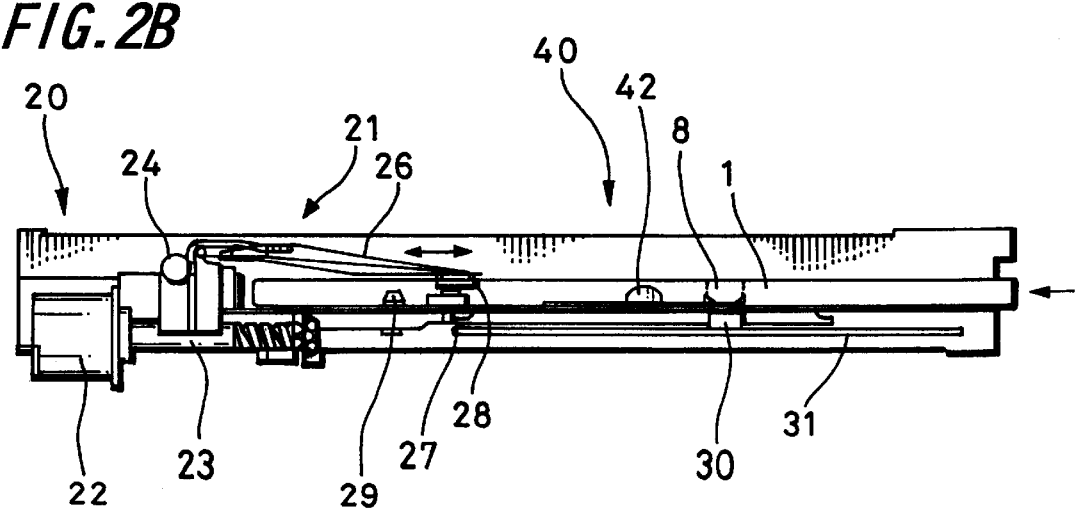

FIGS. 2A and 2B show such a state that the FD type card adapter of the present embodiment has been inserted into a drive device.

First of all, the configuration of an FD drive device 20 will now be described.

With reference to FIGS. 2A and 2B, the FD drive device 20 includes a drive circuit substrate 31, a luminous element 30, and a head unit 21. The drive circuit substrate 31 forms recording and reproducing means for writing data onto and reading data from a recording medium, and generates control signals for recording and reproducing. The luminous element 30 is disposed on the drive circuit substrate 31 to conduct communication of control data between the light receiving element 8 of the FD type card adapter 1 and the luminous element 30. The head unit 21 drives a head to write data onto or read data from the FD or FD type card adapter 1.

The head unit 21 includes a stepping motor 22 driven by a control signal supplied from the drive circuit substrate 31, a lead screw 23 driven and rotated by the stepping motor 22, a carriage 24 moved forward and backward in a direction indicated by arrows according to the rotation of the lead screw 23, a guide bar 25 for ordering the forward or backward movement of the carriage 24, an arm 26 having one end supported on a top surface of the carriage 24, a head 27 (side 0, a reverse side of label) supported on the bottom surface of the carriage 24, and a head 28 (side 1) supported at the other end of the arm 26.

The luminous element 30 is formed so as to radiate visible light taken in countermeasure against disturbance or radiate infrared light in order to prevent disturbance. The luminous element 30 supplies control data via visible light or infrared light. A control signal for making the luminous element 30 radiate light is adapted to be supplied from a host computer which controls the FD drive device 20 and which is not illustrated.

A spindle unit 40 is controlled by a spindle motor which is driven by a control signal supplied from the drive circuit substrate 31 and which is not illustrated. The spindle unit 40 includes a spindle hub 41 for supporting the central part of the FD, a spindle shaft 42 for chucking and rotating the FD, and a drive pin 43. By the way, the spindle unit 40 is controlled so as to stop with respect to the FD type card adapter 1.

If the FD type card adapter 1 is inserted into a predetermined insertion section of the FD drive device 20 in a direction indicated by an arrow, then the switch 3 is turned on as described above, the heads 27 and 28 are disposed in predetermined positions, and the light receiving element 8 of the FD type card adapter 1 is positioned in a position so as to be opposed to the luminous element 30 of the FD drive device 20. As described above, the active state control circuit 6 is provided in the FD type card adapter 1.

A control signal for making the luminous element 30 radiate light is supplied from a host computer which is not illustrated to the luminous element 30 via the drive circuit substrate 31 of the FD drive device 20. The luminous element 30 radiates light and supplies control data to the light receiving element 8 of the FD type card adapter 1 in the form of visible light or infrared light. The light receiving element 8 receives the visible light or infrared light, converts the supplied control data to an electric signal, and supplies the electric signal to the active state control circuit 6 shown in FIG. 1 as described above. The active state control circuit 6 shifts the processor 5 from the power saving mode state to the active state in which data recording or reproducing operation is possible. In the active state, therefore, recording or reproducing operation is immediately conducted on the memory card 9 on the basis of a predetermined operation order of the FD drive device 20.

Figure 3:
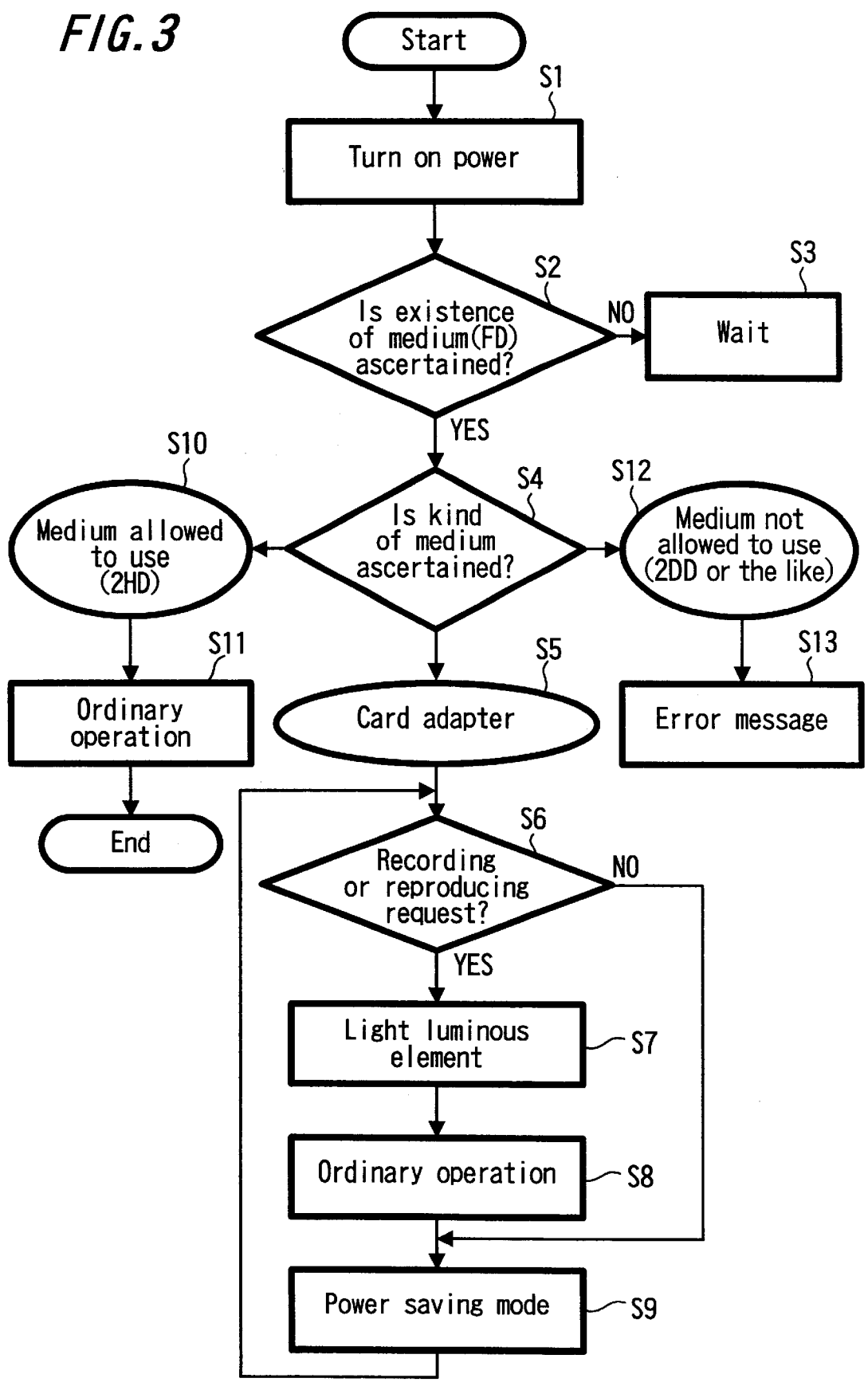
FIG. 3 is a flow chart showing active state control operation in an embodiment according to the present invention.

FIG. 3 shows a flow chart of active state control operation of the present embodiment. FIG. 3 shows operation of a microcomputer on the drive circuit substrate 31 of the above described FD drive device 20 shown in FIG. 2.

Figure 10:
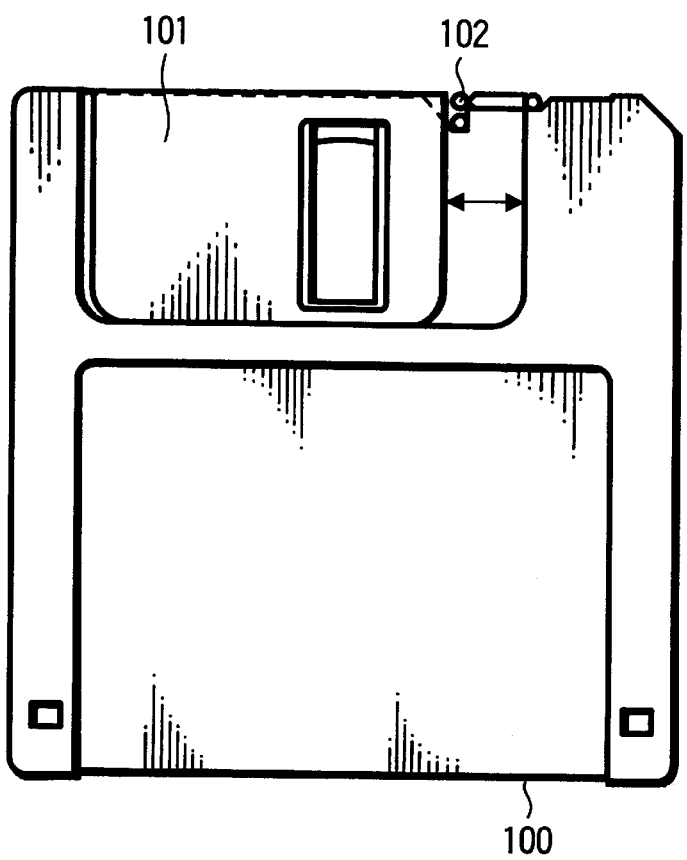
FIG. 10 is a diagram showing a prior art floppy disk.

With reference to FIG. 3, power supply is turned on at step S1. Processing proceeds to step S2, where the existence of the recording medium is ascertained. To be concrete, the microcomputer on the drive circuit substrate 31 of the FD drive device 20 recognizes that the opening and shutting lever 102 shown in FIG. 10 has pressed the actuator 2 shown in FIG. 1 and moved the actuator 2 to a predetermined position. As a result, it is determined whether the FD drive device 20 has rotated and moved the actuator 2 in the counterclockwise direction and turned on the switch 3.

If it is determined at the step S2 that the recording medium is not inserted, then the processing proceeds to step S3, where waiting is conducted. If it is determined at the step S2 that the recording medium is inserted, then the processing proceeds to step S4, where the kind of the recording medium is ascertained. To be concrete, trial reproduction is conducted. Detection using a brief density (HD) switch is conducted. Or it is determined whether data reading of a recording medium permitted to use (such as 2HD (both-sided high density double track type)) could be conducted, and it is determined whether data reading of the FD type card adapter 1 could be conducted. Thereby the microcomputer on the drive circuit substrate 31 of the FD drive device 20 recognizes the kind of the recording medium.

If the recording medium is judged to be the FD type card adapter 1 at the step S4, then the processing proceeds to step S5, where the microcomputer on the drive circuit substrate 31 switches over the mode to the recording or reproducing mode for the FD type card adapter 1. To be concrete, the microcomputer on the drive circuit substrate 31 of the FD drive device 20 stops the rotation of the spindle motor, and fixes the head of the side 0 in the position of track 00 (the outermost side). The head fixing position is such a position that interfacing with the write and read device of the FD type card adapter 1 is possible.

At step S6, it is determined whether there is a recording or reproducing request. To be concrete, the microcomputer on the drive circuit substrate 31 of the FD drive device 20 determines whether a recording or reproducing operation order is issued by input means or a host computer which is not illustrated.

If a recording or reproducing operation order is not issued within a predetermined time at the step S6, then the processing proceeds to step S9 where a shift to the power saving mode is conducted. To be concrete, the microcomputer on the drive circuit substrate 31 of the FD drive device 20 sends a control signal to the processor 5 of the FD type card adapter 1 in order to reduce the power consumption of the battery 7. Thereafter, the processing returns to the step S6.

If there is a recording or reproducing order at the step S6, the processing proceeds to step S7, where the luminous element is lit. To be concrete, a control signal for making the luminous element 30 radiate light is supplied from the host computer to the FD drive device 20. Thereupon, the microcomputer on the drive circuit substrate 31 of the FD drive device 20 supplies a drive signal for light radiation to the luminous element 30 via the drive circuit substrate 31. The luminous element 30 radiates light in response to the drive signal, and supplies control data to the light receiving element 8 of the FD type card adapter 1 via visible light or infrared light. As a result, the light receiving element 8 receives the visible light or infrared light, converts the visible light or infrared light to an electric signal, and supplies the electric signal to the above described active state control circuit 6 shown in FIG. 1. As a result, the active state control circuit 6 shifts the processor 5 from the power saving mode state to the active state allowing the operation for recording or reproducing the data.

At step S8, ordinary operation is conducted. To be concrete, in the active state, recording or reproducing operation is immediately conducted on the memory card 9 on the basis of the recording or reproducing operation order fed from the input means of the FD drive device 20 or the host computer. Thereafter, if a predetermined time has elapsed, the processing proceeds to step S9, where a shift to the power saving mode is conducted again. Then the processing returns to the step S6, and the processing and decision of the steps S6 to S9 are repeated until the power supply is cut off.

If the recording medium is a medium allowed to use (2HD) at the step S4, then the processing proceeds to step S10. At the step S10, switchover to the recording or reproducing mode of the medium allowed to use (2HD) is conducted. Subsequently, ordinary operation is conducted at step S11. To be concrete, the microcomputer on the drive circuit substrate 31 of the FD drive device 20 starts the rotation of the spindle motor, moves the head to a position of a track that data should be recorded onto or reproduced from, and executes recording or reproducing operation.

If the recording medium is a medium which is not allowed to use (such as 2DD (both-sided double density double track type)) at the step S4, the processing proceeds to step S12. At the step S12, switchover to a mode for a medium which is not allowed to use (such as 2DD) is conducted. Subsequently, an error message is issued at step S13. To be concrete, the microcomputer on the drive circuit substrate 31 of the FD drive device 20 displays or vocalizes an error message to the effect that the recording medium which is not allowed to use (such as 2DD) by using a display section or a vocalization section which is not illustrated.

Figure 4:
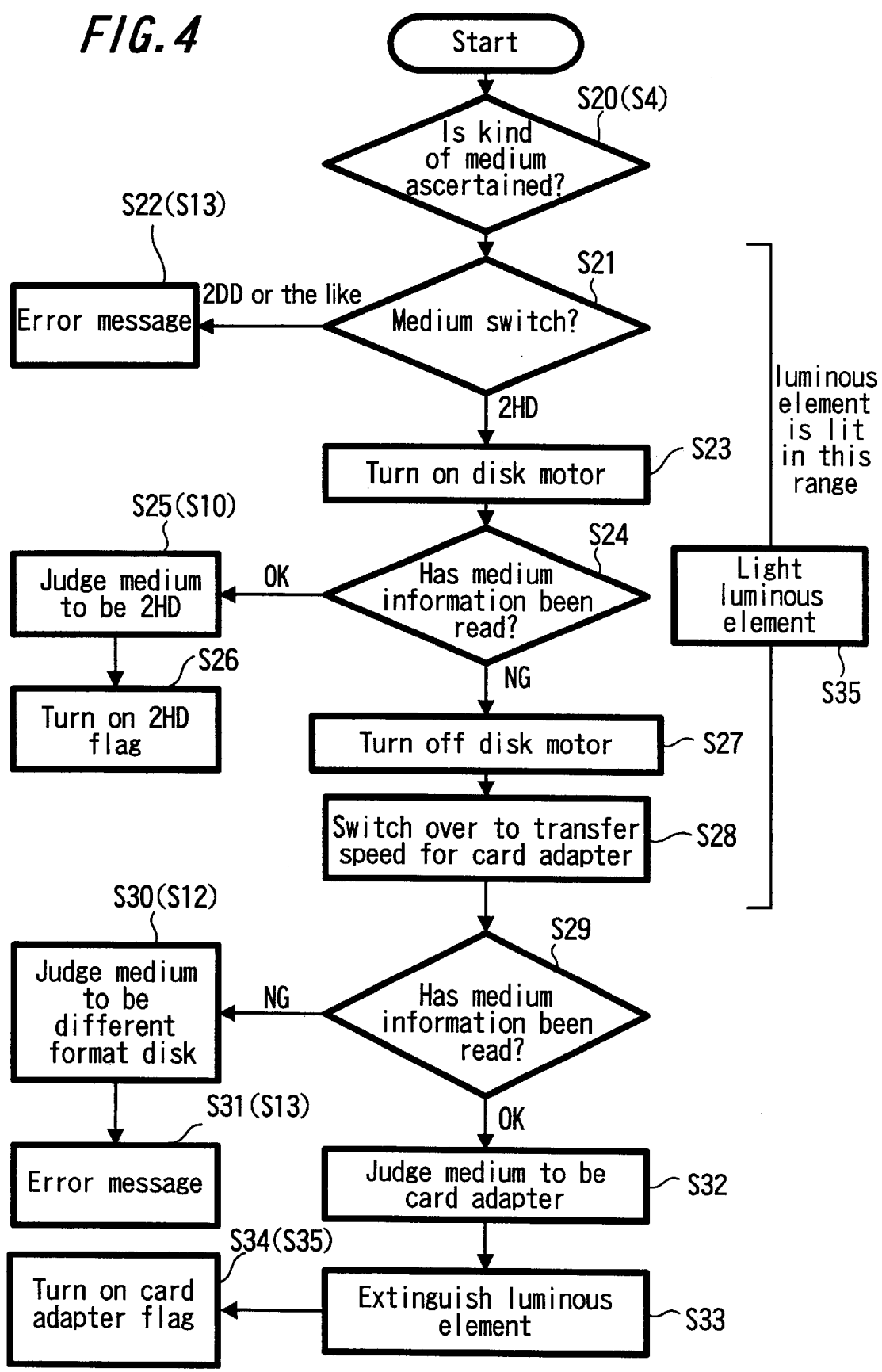
FIG. 4 is a flow chart showing operation of medium discrimination at the time of recording in an embodiment according to the present invention.

FIG. 4 shows a flow chart of medium determination operation of the present embodiment. FIG. 4 corresponds to the above described step S4 of ascertaining the kind of the medium shown in the flow chart of FIG. 3. In the same way as the flow chart of FIG. 3, FIG. 4 shows the operation of the microcomputer on the drive circuit substrate 31 of the FD drive device 20 of FIG. 2. Steps corresponding to the steps in the flow chart of FIG. 3 are given in parentheses.

At step S20 (S4), ascertainment of the kind of the recording medium is started. At step S21, it is determined whether the medium switch is 2HD or 2DD and so on. To be concrete, if a predetermined hole provided in the 2HD recording medium is detected by using, for example, an HD switch of transparent type, then the recording medium is judged to be 2HD. Unless the hole is detected, the recording medium is judged to be 2DD or the like.

If the recording medium is judged to be 2DD or the like by the medium switch at the step S21, then the processing proceeds to step S22 (S13), where the error message is issued. If the recording medium is judged to be 2HD or the like by the medium switch, then the processing proceeds to step S23, where the disk motor is turned on. To be concrete, the microcomputer on the drive circuit substrate 31 of the FD drive device 20 starts the rotation of the spindle motor.

At step S24, medium information is read. To be concrete, the head is moved to a recording track, and information recorded on the disk is subjected to trial reproduction by a predetermined amount. If the medium information can be read at the step S24, then the processing proceeds to step S25 (S10), where the recording medium is judged to be 2HD, and the processing proceeds to step S26, where a 2HD flag is turned on. To be concrete, the microcomputer on the drive circuit substrate 31 of the FD drive device 20 recognizes that the recording medium is 2HD, and causes a shift to a 2HD recording or reproducing mode.

If the medium information cannot be read at the step S24, then the processing proceeds to step S27 to turn off the disk motor, and further proceeds to step S28 to switch the transfer speed over to a transfer speed for card adapter. To be concrete, the microcomputer on the drive circuit substrate 31 of the FD drive device 20 stops the rotation of the spindle motor. In addition, the data transfer speed is switched over so as to match the interface between the head of the FD drive device 20 and the write and read device of the FD type card adapter 1.

At one of the above described step S21 of determining the medium using the medium switch, step S23 of turning on the disk motor, step S24 of reading the medium information, step S27 of turning off the disk motor, and the step S28 of switching over the transfer speed for card adapter, lighting of the luminous element of step S35 is conducted. To be concrete, a control signal for making the luminous element 30 radiate light is supplied from the host computer to the FD drive device 20.

Thereupon, the microcomputer on the drive circuit substrate 31 of the FD drive device 20 supplies a drive signal for light radiation to the luminous element 30 via the drive circuit substrate 31 in response to a drive signal of each step of the steps S21 through S28. The luminous element 30 radiates light on the basis of the drive signal, and supplies control data to the light receiving element 8 of the FD type card adapter 1 via visible light or infrared light. As a result, the light receiving element 8 receives the visible light or infrared light, converts the visible light or infrared light to an electric signal, and supplies the electric signal to the above described active state control circuit 6 shown in FIG. 1. As a result, the active state control circuit 6 shifts in advance the processor 5 from the power saving mode state to the active state allowing the operation for trial reproducing of the data.

The processing proceeds to step S29, where it is determined whether medium information for the FD type card adapter 1 has been read. If the medium information cannot be read at step S29, then the processing proceeds to step S30 (S12), where the disk is judged to be a disk of a different format, and the processing proceeds to step S31 (S13), where an error message is issued.

If the medium information can be read at the step S29, then the processing proceeds to step S32, and the recording medium is judged to be an FD type card adapter. To be concrete, the microcomputer on the drive circuit substrate 31 of the FD drive device 20 fixes the head of side 0 in the position of track 00 (outermost side), makes possible interfacing with the write and read device of the FD type card adapter 1, and thereby conducts trial reproduction of data from the memory card 9 of the FD type card adapter 1.

At step S33, the luminous element is extinguished. Furthermore, the processing proceeds to step S34 (S5), where the card adapter flag is turned on. To be concrete, a control signal for stopping the light radiation of the luminous element 30 is supplied from the host computer. The microcomputer on the drive circuit substrate 31 of the FD drive device 20 stops the supply of the drive signal to the luminous element 30 via the drive circuit substrate 31 in order to stop the light radiation. The luminous element 30 stops the light radiation on the basis of the stoppage of the drive signal, and causes a shift to the data recording or reproducing mode of the FD type card adapter 1.

Figure 5:
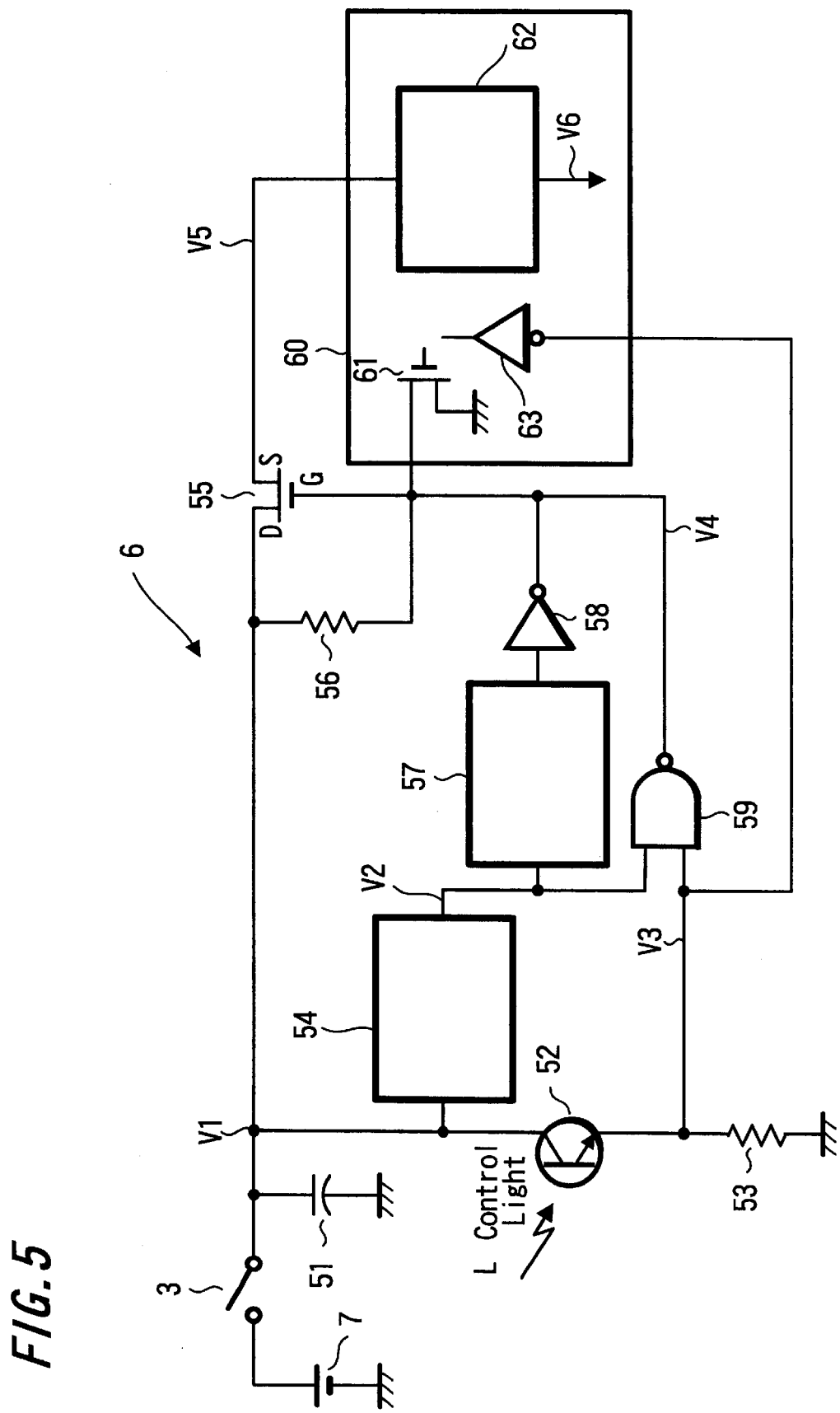
FIG. 5 is a diagram showing a circuit example of an active state control circuit in an embodiment according to the present invention.

FIG. 5 is a diagram showing a circuit example of the active state control circuit of the present embodiment.

In FIG. 5, components corresponding to those of FIG. 1 are denoted by like characters.

First of all, the connection state of the active state control circuit will now be described.

With reference to FIG. 5, the minus side of the battery 7 in the FD type card adapter 1 is connected to the ground. The plus side of the battery 7 is connected to a first end of the switch 3. A second end of the switch 3 is connected to a first end of a capacitor 51. A second end of the capacitor 51 is connected to the ground.

The first end of the capacitor 51 is connected to a phototransistor 52 (the light receiving element 8) at its collector. At its emitter, the phototransistor 52 (the light receiving element 8) is connected to a first end of a resistor 53. A second end of the resistor 53 is connected to the ground. Furthermore, the first end of the capacitor 51 is connected to an input terminal of a voltage detection IC 54. An output terminal of the voltage detection IC 54 is connected to an input terminal of a delay circuit 57. An output terminal of the delay circuit 57 is connected to an input terminal of an open drain inverter 58.

Furthermore, the output terminal of the voltage detection IC 54 is connected to a first input terminal of a NAND circuit 59 which is an open drain gate. The emitter of the phototransistor 52 (the light receiving element 8) is connected to a second input terminal of the NAND circuit 59. Furthermore, the first end of the capacitor 51 is connected to an FET switch 55 at its drain (D). At its source (S), the FET switch 55 is connected to a reset circuit 62 of a controller 60.

An output terminal of the open drain inverter 58 is connected to the FET switch 55 at its gate (G). An output terminal of the NAND circuit 59 is connected to the gate (G) of the FET switch 55. The gate (G) of the FET switch 55 is connected to a power supply control port 61 which is an open drain gate of the controller 60. A first end and a second end of a resistor 56 are connected between the drain (D) and the gate (G) of the FET switch 55. The emitter of the phototransistor 52 (the light receiving element 8) is connected to an input port 63 of the controller 60.

Operation of the active state control circuit having such a configuration will be hereafter be described. FIG. 6 is a time chart showing the operation of the active state control circuit.

First of all, operation of initial current conduction will now be described.

At T1, the FD type card adapter 1 is inserted into the FD drive device 20. Thereupon, the switch 3 is closed and supply of power from the battery 7 is started. Voltage supplied from the battery 7 is supplied to the capacitor 51 via the switch 3. As represented by a charging voltage V1 of FIG. 6A, the capacitor 51 is gradually charged from a low level (L).

If the charging voltage V1 exceeds a lowest operation voltage VMIN of the system at T2, then an output voltage V2 of the voltage detection IC 54 shown in FIG. 6B changes from a low level (L) to a high level (H).

In order to supply power to the controller 60 for a fixed time from the change of the output voltage V2 of the voltage detection IC 54 shown in FIG. 6B, the gate (G) of the FET switch 55 is changed to its low level (L) by the delay circuit 57 and the open drain inverter 58. As a result, the drain (D) and the source (S) of the FET switch 55 are held in the conduction state. At this time, an FET switch output V5 shown in FIG. 6E becomes its high level (H) at T2. As a result, a reset circuit output V6 shown in FIG. 6F becomes its high level (H) for a minute time. As a result, the controller 60 brings the processor 5 into the active state.

Delay time of the delay circuit 57 needs to be long enough so that the controller 60 may conduct processing of initializing itself and changing the power supply control port 61 to its low level (L). The reason can be described as follows. Once the power supply control port 61 is fixed to its low level (L), supply of power to the controller 60 continues even if output operation of the low level (L) from the open drain inverter 58 to the gate (G). of the FET switch 55 is finished.

Operation of drive determination will now be described.

The controller 60 secures supply of power to itself. Thereafter, after T2, the controller 60 reads that a photototransistor output V3 shown in FIG. 6C has become its high level (H) by means of the input port 63. If the phototransistor 52 has detected control light L as in a time period between T2 and T3, then the processor 5 of the FD type card adapter 1 recognizes that itself has been inserted into a specific FD drive device 20 capable of transferring data at high speed. In the time period between T2 and T3, mutual recognition between the FD drive device 20 and the FD type card adapter 1 is conducted so as to start the mutual recognition at T2 and finish the recognition at T3.

If the phototransistor 52 has not detected the control light L as in a time period between T3 and T4, then the processor 5 of the FD type card adapter 1 recognizes that itself has been inserted into an ordinary drive.

If the phototransistor 52 has detected the control light L, then a NAND circuit output V4 supplied from the open drain NAND circuit 59 and shown in FIG. 6D becomes the low level (L) in the time period between T2 and T3. Accordingly, the gate (G) of the FET switch 55 becomes the low level (L). As a result, the drain (D) and source (S) of the FET switch 55 are kept in the conduction state. Therefore, supply of power to the controller 60 is continued.

Operation of the cut off of the power supply will now be described.

The gate (G) of the FET switch 55 is controlled by wired OR of three open drains of the open drain inverter 58, the open drain NAND circuit 59, and the power supply control port 61 functioning as the open drain gate. When the wired OR of three open drains cease the drive, first of all, the open drain inverter 58 ceases the drive soon after the switch 3 is closed. Also the power supply control port 61 of the open drain gate ceases the drive when the power supply becomes unnecessary according to the control program of the controller 60.

When a microcomputer of a specific FD drive device 20 finishes access to the processor 5 and extinguishes the control light L via the luminous element 30 and the phototransistor 52 (the light receiving element 8) of the FD type card adapter 1, the phototransistor output V3 shown in FIG. 6C becomes the low level (L) at T3. Accordingly, the NAND circuit output V4 shown in FIG. 6D becomes the high level (H). Thus the open drain NAND circuit 59 ceases the drive.

As a result, the FET switch output V5 shown in FIG. 6E becomes the low level (L) at T3. Accordingly, supply of power to the controller 60 is cut off.

Hereafter, operation for a specific FD drive device capable of conducting high speed transfer will be described.

Hereafter, re-throw in of power caused by the control light L in a time period between T4 and T5 will be described.

In such a state that the switch 3 remains to be closed and the drain (D) of the FET switch 55 is cut off from the source (S) thereof, it is assumed that access to the processor 5 of the FD type card adapter 1 becomes necessary. At T4, the FD drive device 20 radiates the control light L from the luminous element. Thereupon, the phototransistor 52 (the light receiving element 8) turns on. The phototransistor output V3 shown in FIG. 6C becomes the high level (H).

As a result, the NAND circuit output V4 of the open drain NAND circuit 59 shown in FIG. 6D becomes the low level (L). Accordingly, the drain (D) and source (S) of the FET switch 55 are held in the conduction state. Therefore, the FET switch output V5 shown in FIG. 6E becomes the high level (H). At T4, therefore, the reset circuit output V6 shown in FIG. 6F becomes the high level (H) for a minute time during which the reset operation is conducted. As a result, supply of power to the controller 60 is resumed. Accordingly, the controller 60 brings the processor 5 into the active state.

After securing the supply of power to itself, the controller 60 reads the level of the output V3 of the phototransistor 52 (the light receiving element 8) shown in FIG. 6C by means of the input port 63. By detecting the input of the control light L from the level of the input port 63, the controller 60 conducts the data transfer with the FD drive device 20 resulting from reproducing (read (R)) or recording (write (W)) until T5 at a transfer rate of a specific FD drive device 20 capable of conducting high speed transfer.

Finally, at T6, the FD type card adapter 1 is ejected from the FD drive device 20. Thereupon, the switch 3 is cut off, and supply of power from the battery 7 is stopped. Each of the charging voltage V1 shown in FIG. 6A, the output voltage V2 of the voltage detection IC 54 shown in FIG. 6B, and the NAND circuit output V4 shown in FIG. 6D becomes the low level (L).

Figure 7A:
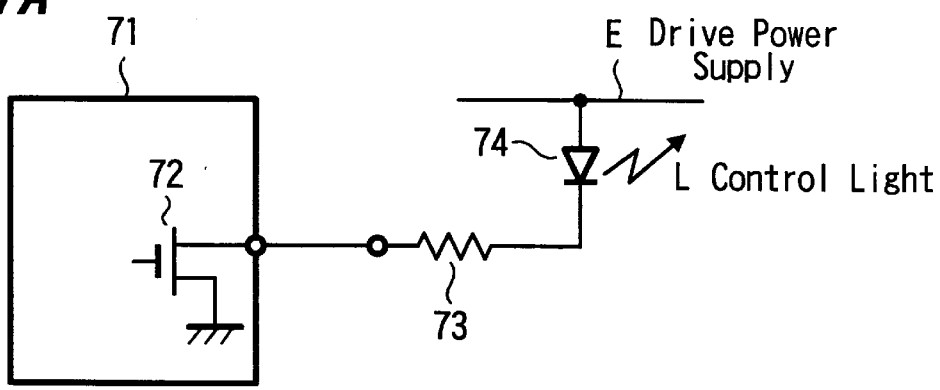
Figure 7B:
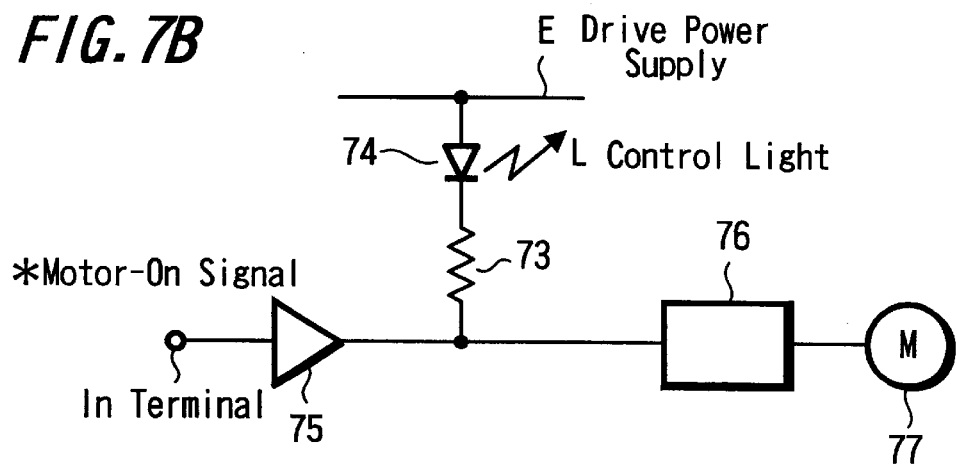
Figure 7C:
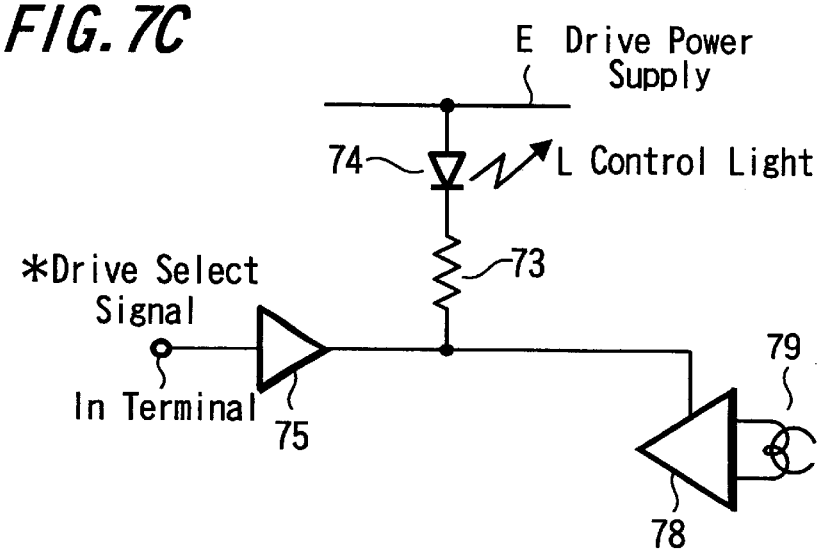

FIGS. 7A through 7C show circuit examples of luminous element side of the present embodiment. FIGS. 7A through 7C show circuits in the FD drive device 20.

FIG. 7A shows light radiation caused by a dedicated control signal. In FIG. 7A, a control port 72 of a main body side microcomputer 71 is connected to a first end of a resistor 73. A second end of the resistor 73 is connected to a light emitting diode 74 at its cathode. At its anode, the light emitting diode 74 is connected to a drive power source E. The main body side microcomputer 71 is a microcomputer on the drive circuit board 31 of the FD drive device 20. In such a configuration, the control port 72 of the main body side microcomputer 71 is controlled by a dedicated light radiation signal so as to become the low level (L). As a result, the light emitting diode 74 emits control light L.

FIG. 7B shows light radiation caused by the rotation of the spindle motor. In FIG. 7B, a terminal IN is supplied with an active low (*) motor-on signal. The terminal IN is connected to an input of an amplifier 75. An output side of the amplifier 75 is connected to a first end of a resistor 73. A second end of the resistor 73 is connected to a light emitting diode 74 at its cathode. At its anode, the light emitting diode 74 is connected to a drive power source E. The output side of the amplifier 75 is connected to an input side of a motor driver 76. An output side of the motor driver 76 is connected to a spindle motor 77. The motor-on signal is a signal supplied from a microcomputer on the drive circuit substrate 31 of the FD drive device 20. In such a configuration, if the spindle motor 77 is driven to be rotated via the amplifier 75 and the motor driver 76 by controlling the motor-on signal so as to become a low level (L), then the light emitting diode 74 always emits the control light L.

FIG. 7C shows light radiation caused by the drive select. In FIG. 7C, a terminal IN is supplied with an active low (*) drive select signal. The terminal IN is connected to a input side of an amplifier 75. An output side of the amplifier 75 is connected to a first end of a resistor 73. A second end of the resistor 73 is connected to a light emitting diode 74 at its cathode. At its anode, the light emitting diode 74 is connected to a drive power source E. The output side of the amplifier 75 is connected to an input side of a head amplifier 78. An output side of the head amplifier 78 is connected to a head 79. A drive select signal for conducting recording or reproducing on the recording medium is a signal supplied from the microcomputer on the drive circuit substrate 31 of the FD drive device 20. In such a configuration, if the head is magnetized via the amplifier 75 and the head amplifier 78 by controlling the drive select signal so as to become a low level (L), then at the same time the light emitting diode 74 emits the control light L.

Heretofore, the present embodiment has been described with respect to the FD type card adapter 1. However, the present embodiment is not limited to this, but the present embodiment can be applied to various recording medium adapter devices.

Figure 8:
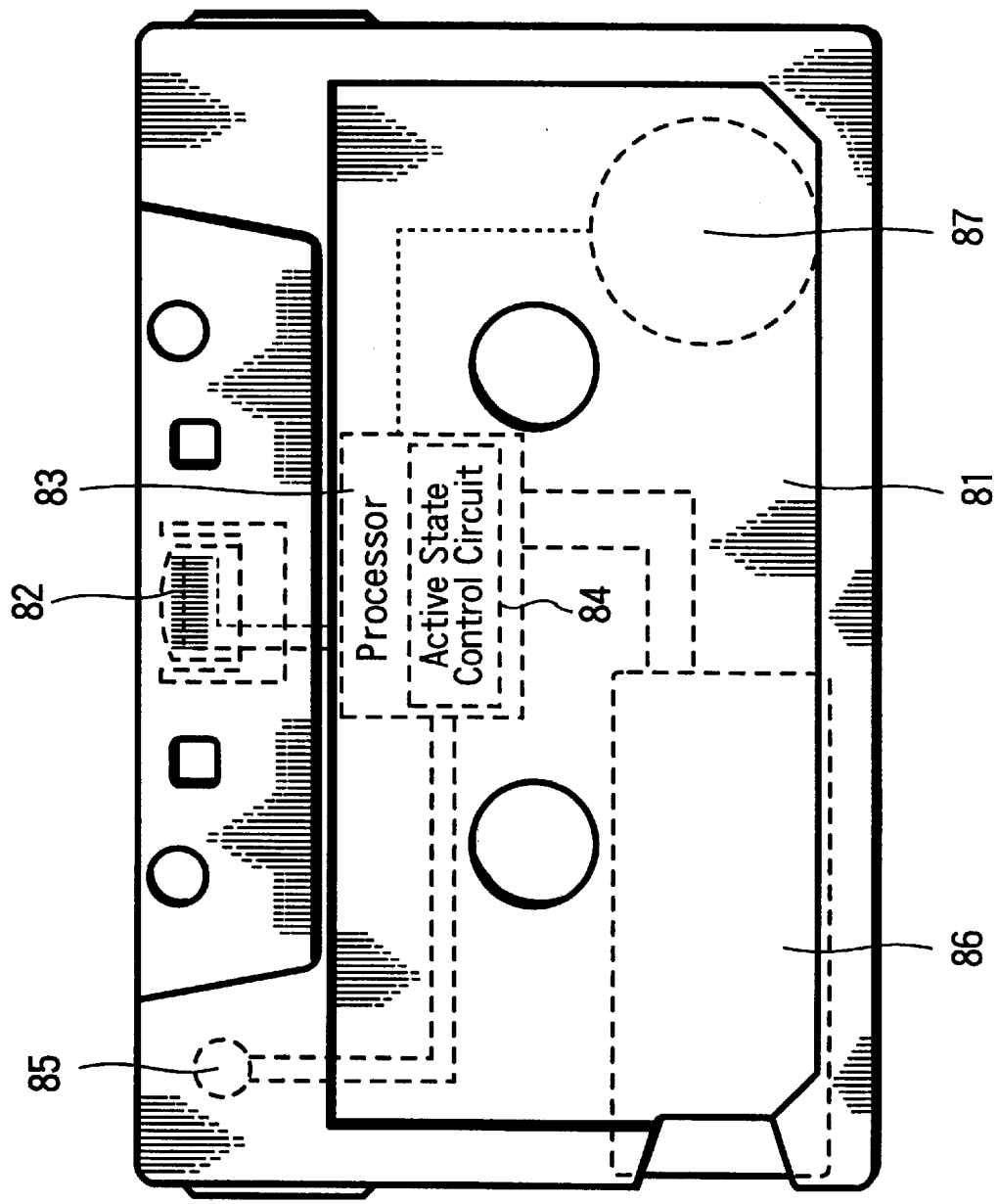
FIG. 8 is a diagram showing the configuration of a cassette tape type card adapter in an embodiment according to the present invention.

FIG. 8 is a diagram showing the configuration of a cassette tape type card adapter of the present embodiment. A cassette tape type card adapter 81 shown in FIG. 8 corresponds to the FD type card adapter 1 shown in FIG. 1. A write and read device 82 corresponds to the write and read device 4. A processor 83 corresponds to the processor 5. An active state control circuit 84 corresponds to the active state control circuit 6. A battery 87 corresponds to the battery 7. A memory card 86 corresponds to the memory card 9.

Although not illustrated, components corresponding to the switch 3 and the actuator for detecting the fact that the FD type card adapter 1 has been inserted into the FD drive device 20 are disposed in the cassette tape type card adapter 81 shown in FIG. 8. A configuration of remaining portions is similar to that of the FD type card adapter 1. Features are that there are provided a light receiving element 85 for forming communication means to conduct communication with the recording and reproducing device, and an active state control circuit 84 for causing a shift from the power saving mode state to the active state in which operation for recording or reproducing data is possible.

Figure 9:
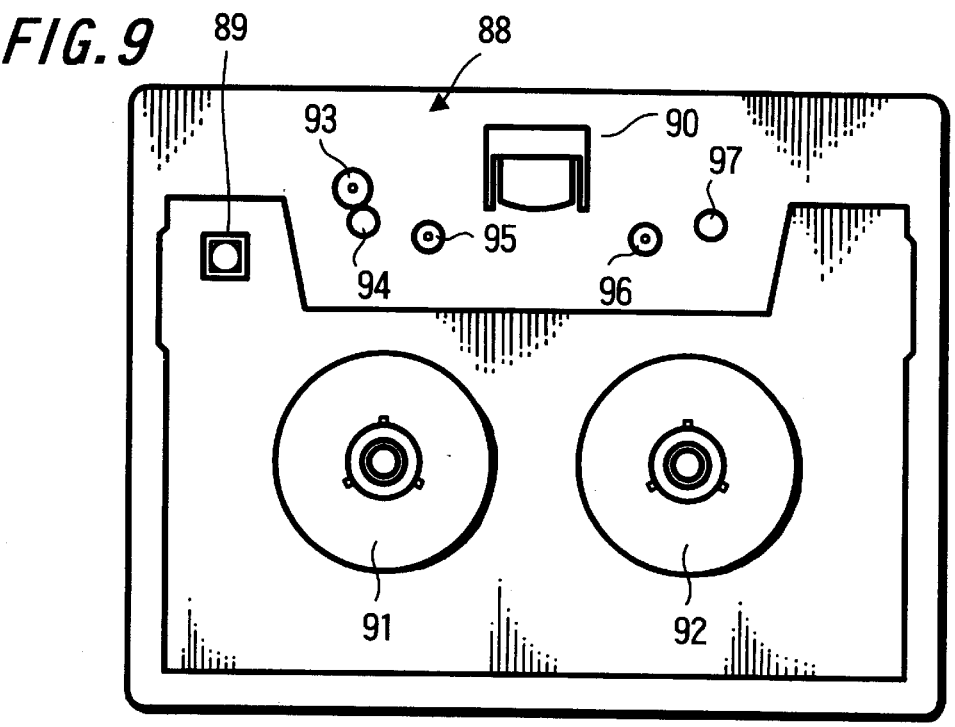
FIG. 9 is a diagram showing the configuration of a magnetic tape drive device in an embodiment according to the present invention.

FIG. 9 is a diagram showing the configuration of a magnetic tape drive device of the present embodiment.

FIG. 9 shows a recording and reproducing device in which the above described cassette tape type card adapter 81 of FIG. 8 is inserted and which conducts the recording and reproducing operation.

In FIG. 9, a magnetic tape drive device 88 includes reel bases 91 and 92 for mounting the cassette tape type card adapter 81 or cassette tape thereon, a roller 93, a capstan 94, and rollers 95, 96 and 97 for making magnetic tape of cassette tape travel along a predetermined route, a magnetic head 90 for conducting recording or reproducing on the cassette tape type card adapter 81 or cassette tape, and a luminous element 89 for radiating predetermined control light L. The luminous element 89 is disposed so as to be opposed to the light receiving element 85.

In the magnetic tape drive device 88 having such a configuration, a control signal for making the luminous element 89 radiate light is supplied from the host computer to the magnetic tape drive device 88. In response to each drive signal for recording or reproducing, a microcomputer on a drive circuit substrate of the magnetic tape drive device 88 supplies a drive signal for light radiation to the luminous element 89 via the drive circuit substrate. The luminous element 89 radiates light on the basis of the drive signal, and supplies control data to the light receiving element 85 of the cassette tape type card adapter 81 via visible light or infrared light. As a result, the light receiving element 85 receives visible light or infrared light, converts the visible light or infrared light to an electric signal, and supplies the electric signal to the above described active state control circuit 84 shown in FIG. 8. Accordingly, the active state control circuit 84 effects control of the processor 83 to cause a shift from the power saving mode state to the active state in which operation for recording or reproducing is possible.

Thus, according to the present embodiment, the luminous element of visible light or infrared light is provided in the recording and reproducing apparatus. The light receiving element is provided in the recording medium adapter. In addition, the active state control circuit for shifting the recording medium adapter to the electrically active state in response to the control signal supplied from the luminous element is provided in the recording medium adapter. As a result, it becomes possible to exit the power saving mode in a short time, without conducting the reset by pulling out the recording medium from the recording and reproducing apparatus and inserting the recording medium into the recording and reproducing apparatus. In addition, since the recording medium is not pulled out and inserted, the durability of the insertion mechanism is not affected, either.

In the above described embodiment, the FD drive device 20 and the magnetic drive device 88 form the recording and reproducing means. The memory cards 9 and 86 form other recording media. The switch 3 forms the detection means. The FD type card adapter 1 and the cassette type card adapter 81 form recording medium adapters. The luminous elements 30 and 89 and light receiving elements 8 and 85 form communication means. Furthermore, the write and read devices 4 and 82, and the processors 5 and 83 form data processing means. The active state control circuits 6 and 84 form active state control means.

The above described recording and reproducing apparatus of the present embodiment includes: the FD drive device 20 serving as the recording and reproducing means for conducting data writing or reading on a predetermined recording medium; the switch 3 serving as the detection means for detecting that the FD type card adapter 1 serving as the recording medium adapter for conducting data writing or reading on the memory card 9 serving as another recording medium different from the recording medium by using the recording and reproducing means has been inserted; and the luminous element 30 serving as the communication means for conducting communication of control data of predetermined data, in order to effect control related to operation of the recording and reproducing means between the recording medium adapter and the recording and reproducing apparatus, when insertion of the recording medium adapter has been detected by the detection means. Therefore, the recording medium adapter can be brought into an arbitrary control state by conducting communication of the control data with the recording medium adapter, without conducting the reset by means of ejection and re-insertion of the recording medium adapter with respect to the recording and reproducing apparatus.

Furthermore, in the above described recording and reproducing apparatus of the present embodiment, the luminous element 30 serving as the communication means is provided on the drive circuit substrate 31 serving as a control section which takes charge of a part or the whole of the control for recording or reproducing operation conducted by the FD drive device 20 serving as the recording and reproducing means. Therefore, the communication means can be provided by using an existing substrate, without installing additional substrate configuration for the communication means and without increasing the size of the configuration.

In the above described recording and reproducing apparatus of the present embodiment, the luminous element 30 serving as the communication means conducts communication of the control data in response to the data recording or reproducing operation conducted by the FD drive device 20 serving as the recording and reproducing means. Therefore, the recording medium adapter can be automatically brought into an arbitrary control state by making the communication means conduct communication of the control data simultaneously with occurrence of a signal of recording or reproducing operation.

In the above described recording and reproducing apparatus of the present embodiment, the control data L shifts the FD type card adapter 1 serving as the recording medium adapter to such a state that the data recording or reproducing operation can be conducted by the FD drive device 20 serving as the recording and reproducing means. Therefore, the recording medium adapter can be shifted from the power saving mode to the active state in a short time, without conducting the reset by pulling out the recording medium adapter from the recording and reproducing apparatus and inserting the recording medium adapter into the recording and reproducing apparatus. Furthermore, the durability of the insertion mechanism can be improved because the recording medium adapter is not pulled out and inserted.

The recording medium adapter apparatus of the present embodiment includes: the switch 3 serving as the detection means for detecting that the recording medium adapter apparatus has been inserted into a recording and reproducing apparatus for conducting data writing or reading on a predetermined recording medium by using the FD drive device 20 serving as the recording and reproducing means; the write and read device 4 and the processor 5 serving as the data processing means for conducting processing to conduct data writing or reading on the memory card serving as another recording medium different from the recording medium by using the recording and reproducing means; and the light receiving element 8 serving as the communication means for conducting communication of control data of predetermined data, in order to effect control related to operation of the recording and reproducing means between the recording and reproducing apparatus and the recording medium adapter apparatus, when insertion of the recording medium adapter apparatus into the recording and reproducing apparatus has been detected by the detection means. Therefore, the recording medium adapter can be brought into an arbitrary control state by conducting communication of the control data from the recording and reproducing apparatus, without conducting the reset by means of ejection and re-insertion of the recording medium adapter with respect to the recording and reproducing apparatus.

Furthermore, in above described recording medium adapter apparatus of the present embodiment, there is provided the active state control circuit 6 serving as the active state control means for causing a shift to such a state that the data recording or reproducing operation conducted by the write and read device 4 and the processor 5 serving as the data processing means when communication of the control data L has been conducted by the light receiving element 8 serving as the communication means. Therefore, the recording medium adapter can be shifted from the power saving mode to the active state in a short time, without conducting the reset by pulling out the recording medium adapter from the recording and reproducing apparatus and inserting the recording medium adapter into the recording and reproducing apparatus. Furthermore, there is also brought about an effect that the durability of the insertion mechanism can be improved because the recording medium adapter is not pulled out and inserted.

The recording and reproducing method of the present embodiment includes the steps of: detecting that a recording medium adapter has been inserted into a recording and reproducing apparatus for conducting data writing or reading on a predetermined recording medium; conducting communication of control data of predetermined data, in order to effect control related to recording and reproducing operation between the recording and reproducing apparatus and the recording medium adapter, when insertion of the recording medium adapter into the recording and reproducing apparatus has been detected; and conducting data processing to effect data writing or reading on another recording medium different from the recording medium. Therefore, the recording medium adapter can be brought into an arbitrary control state in short time processing by conducting communication of the control data with the recording medium adapter, without conducting the reset by means of ejection and re-insertion of the recording medium adapter with respect to the recording and reproducing apparatus.

Furthermore, in the above described recording and reproducing method of the present embodiment, there is provided an active state control step of causing a shift to such a state that the data recording or reproducing operation conducted by the data processing means when communication of the control data has been conducted by the communication step. Therefore, the recording medium adapter can be shifted from the power saving mode to the active state by short time processing, without conducting the reset by pulling out the recording medium adapter from the recording and reproducing apparatus and inserting the recording medium adapter into the recording and reproducing apparatus. Furthermore, the durability of the insertion mechanism can be improved because the recording medium adapter is not pulled out and inserted.

In the examples shown in the above described embodiment, the recording medium is an FD type card adapter or a cassette tape type card adapter. However, other card adapters, for example, optical disk type card adapters including a mini disk (MD), a digital versatile disk (DVD) of phase change recording type, or a CD-ROM of rewriting type may also be used.

A recording and reproducing apparatus of the present invention includes: recording and reproducing means for conducting data writing or reading on a predetermined recording medium; detection means for detecting that a recording medium adapter for conducting data writing or reading on another recording medium different from the recording medium by using the recording and reproducing means has been inserted; and communication means for conducting communication of control data of predetermined data, in order to effect control related to operation of the recording and reproducing means between the recording medium adapter and the recording and reproducing apparatus, when insertion of the recording medium adapter has been detected by the detection means. Therefore, there is brought about an effect that the recording medium adapter can be brought into an arbitrary control state by conducting communication of the control data with the recording medium adapter, without conducting the reset by means of ejection and re-insertion of the recording medium adapter with respect to the recording and reproducing apparatus.

Furthermore, in the above described recording and reproducing apparatus of the present invention, the communication means is provided in a control section which takes charge of a part or the whole of the control for recording or reproducing operation conducted by the recording and reproducing means. Therefore, there is brought about an effect that the communication means can be provided by using an existing substrate, without installing additional substrate configuration for the communication means and without increasing the size of the configuration.

Furthermore, in the above described recording and reproducing apparatus of the present invention, the communication means conducts communication of the control data in response to the data recording or reproducing operation conducted by the recording and reproducing means. Therefore, there is brought about an effect that the recording medium adapter can be automatically brought into an arbitrary control state by making the communication means conduct communication of the control data simultaneously with occurrence of a signal of recording or reproducing operation.

Furthermore, in the above described recording and reproducing apparatus of the present invention, the control data shifts the recording medium adapter to such a state that the data recording or reproducing operation can be conducted by the recording and reproducing means. Therefore, there is brought about an effect that the recording medium adapter can be shifted from the power saving mode to the active state in a short time, without conducting the reset by pulling out the recording medium adapter from the recording and reproducing apparatus and inserting the recording medium adapter into the recording and reproducing apparatus. Furthermore, there is also brought about an effect that the durability of the insertion mechanism can be improved because the recording medium adapter is not pulled out and inserted.

A recording medium adapter apparatus of the present invention includes: detection means for detecting that the recording medium adapter apparatus has been inserted into a recording and reproducing apparatus for conducting data writing or reading on a predetermined recording medium by using recording and reproducing means; data processing means for conducting processing to conduct data writing or reading on another recording medium different from the recording medium by using the recording and reproducing means; and communication means for conducting communication of control data of predetermined data, in order to effect control related to operation of the recording and reproducing means between the recording and reproducing apparatus and the recording medium adapter apparatus, when insertion of the recording medium adapter apparatus into the recording and reproducing apparatus has been detected by the detection means. Therefore, there is brought about an effect that the recording medium adapter can be brought into an arbitrary control state by conducting communication of the control data from the recording and reproducing apparatus, without conducting the reset by means of ejection and re-insertion of the recording medium adapter with respect to the recording and reproducing apparatus.

Furthermore, in above described recording medium adapter apparatus of the present invention, there is provided active state control means for causing a shift to such a state that the data recording or reproducing operation conducted by the data processing means when communication of the control data has been conducted by the communication means. Therefore, there is brought about an effect that the recording medium adapter can be shifted from the power saving mode to the active state in a short time, without conducting the reset by pulling out the recording medium adapter from the recording and reproducing apparatus and inserting the recording medium adapter into the recording and reproducing apparatus. Furthermore, there is also brought about an effect that the durability of the insertion mechanism can be improved because the recording medium adapter is not pulled out and inserted.

A recording and reproducing method of the present invention includes the steps of: detecting that a recording medium adapter has been inserted into a recording and reproducing apparatus for conducting data writing or reading on a predetermined recording medium; conducting communication of control data of predetermined data, in order to effect control related to recording and reproducing operation between the recording and reproducing apparatus and the recording medium adapter, when insertion of the recording medium adapter into the recording and reproducing apparatus has been detected; and conducting data processing to effect data writing or reading on another recording medium different from the recording medium. Therefore, there is brought about an effect that the recording medium adapter can be brought into an arbitrary control state in short time processing by conducting communication of the control data with the recording medium adapter, without conducting the reset by means of ejection and re-insertion of the recording medium adapter with respect to the recording and reproducing apparatus.

Furthermore, in the above described recording and reproducing method of the present invention, there is provided an active state control step of causing a shift to such a state that the data recording or reproducing operation conducted by the data processing means when communication of the control data has been conducted by the communication step. Therefore, there is brought about an effect that the recording medium adapter can be shifted from the power saving mode to the active state by short time processing, without conducting the reset by pulling out the recording medium adapter from the recording and reproducing apparatus and inserting the recording medium adapter into the recording and reproducing apparatus. Furthermore, there is also brought about an effect that the durability of the insertion mechanism can be improved because the recording medium adapter is not pulled out and inserted.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A recording and reproducing apparatus comprising:
   recording and reproducing means for conducting data writing or reading on a first recording medium, wherein the first recording medium is moved during writing or reading;
   detection means for detecting that a recording medium adapter for conducting data writing or reading on a second recording medium different from said first recording medium has been inserted in said recording and reproducing means, wherein the second recording medium is contained in said adapter and is not moved during writing or reading and said adapter includes a battery and a control circuit for setting said adapter in an active mode or in a power saving mode; and
   communication means for conducting communication of predetermined control data to said recording medium adapter containing said second recording medium when insertion of said recording medium adapter has been detected by said detection means, wherein said control circuit switches said recording medium adapter from said power saving mode to said active mode.

2. The recording and reproducing apparatus according to claim 1, wherein said communication means conducts communication of said control data in response to operation of said recording and reproducing means.

3. The recording and reproducing apparatus according to claim 1, wherein said communication means communicates said control data via one of visible light and infrared light.

4. The recording and reproducing apparatus according to claim 1, wherein said first recording medium is a floppy disk, and said second recording medium is a memory card.

5. The recording and reproducing apparatus according to claim 1, wherein said first recording medium is cassette tape, and said second recording medium is a memory card.

6. A recording medium adapter apparatus comprising:

detection means for detecting that said recording medium adapter apparatus has been inserted into a recording and reproducing apparatus, wherein said recording and reproducing means performs data writing or reading on a first recording medium that is moved during data writing or reading;

a second recording medium contained in said recording medium adapter that is not moved during data writing or reading;

data processing means for conducting processing to conduct data writing or reading on said second recording medium different from said first recording medium by using said recording and reproducing means; and a battery connected to said data processing means;

a control circuit connected to said battery for setting said recording medium adapter in an active mode or in a power saving mode; and communication means for conducting communication of predetermined control data from said recording and reproducing apparatus to said recording medium adapter apparatus, when insertion of said recording medium adapter apparatus into said recording and reproducing apparatus has been detected by said detection means, wherein said control circuit switches said recording medium adapter from the power saving mode to the active mode.

7. The recording medium adapter apparatus according to claim 6 wherein said communication means conducts communication of said control data via visible light or infrared light.

8. The recording medium adapter apparatus according to claim 6, wherein said first recording medium is a floppy disk, and said second recording medium is a memory card.

9. The recording medium adapter apparatus according to claim 6, wherein said first recording medium is cassette tape, and said second recording medium is a memory card.

10. A recording and reproducing method comprising the steps of:

detecting that a recording medium adapter has been inserted into a recording and reproducing apparatus for conducting data writing or reading on a first recording medium that is moved during data writing or reading, wherein the recording medium adapter contains a second recording medium that is not moved during data writing or reading and said recording medium adapter includes a battery and a control circuit for setting the recording medium adapter in an active mode or in a power saving mode;

conducting communication of control data from said recording and reproducing apparatus to said recording medium adapter, when insertion of said recording medium adapter into said recording and reproducing apparatus is detected in said step of detecting, whereby the recording medium adapter is switched from the power saving mode to the active mode; and conducting data processing to effect data writing or reading on the first recording medium during the active mode of the recording medium adapter.

11. The recording and reproducing method according to claim 10, wherein said communication step comprises conducting communication of said control data via one of visible light and infrared light.

* * * * *